US012103326B2

(12) United States Patent
Madaschi et al.

(10) Patent No.: US 12,103,326 B2
(45) Date of Patent: Oct. 1, 2024

(54) GRIPPING DEVICE OF SEWING THREAD FOR BOOKBINDING SEWING MACHINE WITH GAS JET

(71) Applicant: Meccanotecnica S.p.A., Gazzaniga (IT)

(72) Inventors: Marco Madaschi, Torre de' Roveri (IT); Germano Adobati, Nembro (IT)

( * ) Notice: Subject to any disclaimer, the term of this patent is extended or adjusted under 35 U.S.C. 154(b) by 0 days.

(21) Appl. No.: 17/788,879

(22) PCT Filed: Dec. 24, 2020

(86) PCT No.: PCT/EP2020/087857

§ 371 (c)(1),
(2) Date: Jun. 24, 2022

(87) PCT Pub. No.: WO2021/130360

PCT Pub. Date: Jul. 1, 2021

(65) Prior Publication Data

US 2023/0048999 A1 Feb. 16, 2023

(30) Foreign Application Priority Data

Dec. 27, 2019 (IT) ........................ 102019000025618

(51) Int. Cl.
*B42B 2/02* (2006.01)

(52) U.S. Cl.
CPC ...................................... *B42B 2/02* (2013.01)

(58) Field of Classification Search
CPC ........................................................ B42B 2/02
USPC .................................... 412/9, 25, 28, 33, 35
See application file for complete search history.

(56) References Cited

U.S. PATENT DOCUMENTS

2019/0255871 A1* 8/2019 Maffeo ..................... B42B 2/02

FOREIGN PATENT DOCUMENTS

EP 1477322 A1 11/2004
IT 201600076770 A1 1/2018
WO WO-2018015916 A2 * 1/2018 .............. B42B 2/02

OTHER PUBLICATIONS

PCT International Bureau, "International Search Report and Written Opinion" from PCT Application No. PCT/EP/2020/08757, Mar. 31, 2021, pp. 1 through 12, Published: PCT.

* cited by examiner

*Primary Examiner* — Justin V Lewis
(74) *Attorney, Agent, or Firm* — FisherBroyles LLP; Bryan A. Santarelli

(57) ABSTRACT

A gripping device (200) is proposed for gripping a sewing thread (415) in a bookbinding sewing machine (100). The gripping device (200) comprises a crochet (205) and a body (220) that are slidable reciprocally between an open condition, wherein a hook (215) of the crochet (205) hooks the sewing thread (415), and a closed condition, wherein the hook (215) blocks the sewing thread (415); the body (220) has one or more channels (270) crossing it for conveying a gas jet towards the hook (215). A bookbinding sewing machine (100) comprising one or more gripping devices (200) is also proposed. Moreover, a corresponding method for sewing signatures (115) into book blocks (155) is proposed.

20 Claims, 8 Drawing Sheets

GRIPPING DEVICE OF SEWING THREAD FOR BOOKBINDING SEWING MACHINE WITH GAS JET

This application claims priority to International Patent Application No. PCT/EP2020/087857 filed on Dec. 24, 2020 which claims priority to Italian Patent Application No. 102019000025618 filed on Dec. 27, 2019, which applications are incorporated by reference herein.

TECHNICAL FIELD

The present disclosure relates to the bookbinding field. More specifically, this disclosure relates to bookbinding sewing machines.

TECHNOLOGICAL CONTEXT

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Bookbinding sewing machines are commonly used to sew signatures, also known as sections, to each other into (book) blocks for the production of corresponding books of sewn type. For this purpose, each (bookbinding) sewing machine comprises a number of (mechanical) members for performing different operations on the signatures.

For example, needles and crochets are used to form stitchings between the signatures of each book block with corresponding (sewing) threads; particularly, the stitchings comprise rows of plain stitches (formed by the needles) and rows of looped stitches (formed by the crochets) that are concatenated to each other. For this purpose, corresponding punchers arranged within a movable saddle, on which each signature to be sewn is loaded, are used to form holes in a back of the signature for the needles and the crochets. Corresponding shuttles are used to convey the threads from the needles to the adjacent crochets within the movable saddle, so as to concatenate the plain stitches with the looped stitches. Corresponding cutters arranged above the movable saddle are used to cut the threads after each book block has been completed, so as to separate it therefrom.

Moreover, the Italian patent No. 102016000076770 proposes a gripping device (thread-clamp) for gripping the thread in a sewing machine. The thread-clamp comprises a crochet and a body that are slidable reciprocally between an open condition (wherein a hook of the crochet hooks the thread) and a closed condition (wherein the hook blocks the thread). This thread-clamp allows gripping the thread, blocking it so that the thread may not slide with respect thereto, in a simple and effective way; particularly, the thread-clamp combines the functions of a crochet (for hooking the thread) with those of a pair of pliers (for blocking the thread).

The thread-clamp may have a number of applications that significantly improve operation of the sewing machine. Particularly, the thread-clamp may be used to complete the book blocks without any blind stitches.

Indeed, on the last signature each book block, the rows of plain stitches end with corresponding free tails and the rows of looped stiches ends with corresponding free loops. Therefore, in order to avoid that the cut threads (i.e., the free tails and/or the free loops) might return into the last signature (thereby loosening the corresponding stitchings and then compromising the compactness and the integrity of the book block during its next processing steps) a blind stitch, i.e., without any signature, is typically made after sewing the last signature; in this way, in each stitching the free tail is blocked into the corresponding free loop so as to prevent the thread from returning into the last signature. However, the making of the blind stitches reduces the yield of the sewing machine, since it requires an idle cycle (i.e., wherein no signature is sewn) at the end of each book block. This is particularly evident in the production of small books (for example, books for children), wherein each book block is formed by a low number of signatures, since a ratio between the idle cycles and the operating cycles being actually useful, wherein the signatures are sewn, is very high (for example, 25-33% for book blocks each formed by 4-3 signatures, respectively).

The international application published with the No. WO-A-2018/015916 describes a technique for completing the book blocks without blind stiches using this thread-clamp. Briefly, for each thread a shuttle brings it to an intermediate position aligned with the corresponding free loop (along an advancement direction of the signatures during their sewing). The thread-clamp brings a portion of the thread from the intermediate position through the free loop. The thread-clamp is actuated to block the thread, which is then cut. At this point, the thread-clamp pulls the (cut) thread away from the free loop, so as to tighten the free loop around the thread. As a result, it is possible to obtain a good compactness of the book blocks, at the same time with a high yield of the sewing machine.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of adding a gas jet.

Particularly, an aspect provides a gripping device for gripping a sewing thread in a bookbinding sewing machine. The gripping device comprises a crochet and a body that are slidable reciprocally between an open condition, wherein a hook of the crochet hooks the sewing thread, and a closed condition, wherein the hook blocks the sewing thread; the body has one or more channels crossing it for conveying a gas jet towards the hook.

A further aspect provides a bookbinding sewing machine comprising one or more of these gripping devices.

A further aspect provides a corresponding method for sewing signatures into book blocks.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. In addition, orientations and related position references (such as upper, lower, lateral and so on) are to be understood in relation to a condition of use of the corresponding entities. Particularly.

DETAILED DESCRIPTION

Figure 1:
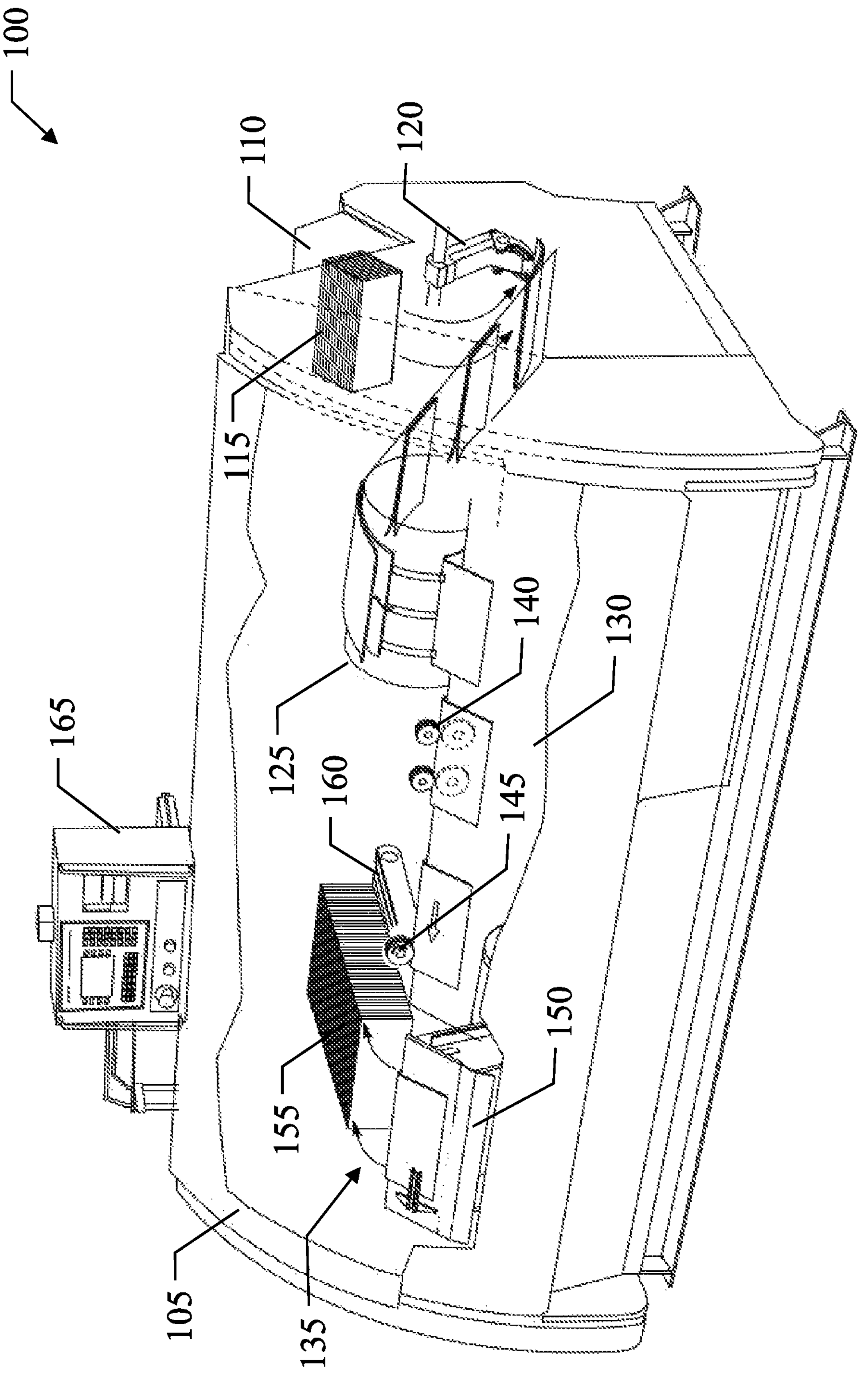
FIG. 1 shows a pictorial representation of a bookbinding sewing machine wherein a gripping device (thread-clamp) according to an embodiment of the present disclosure may be used.

With reference in particular to FIG. 1, a pictorial representation is shown of a (bookbinding) sewing machine 100 wherein a gripping device (thread-clamp) according to an embodiment of the present disclosure may be used.

The sewing machine 100 is used for sewing blocks of signatures to each other, so as to form book blocks for the production of corresponding books of sewn type (not shown in the figure); for example, each signature is formed by a printed sheet, which is folded one or more times to define different pages of the books.

The sewing machine 100 comprises a bearing frame 105 for its components, which is provided with a carter for covering them. Particularly, a hopper 110 is used to load a stack of signatures to be sewn, denoted with the reference 115 (ordered according to the book blocks to be formed). An extraction device 120 extracts the signatures 115 in succession from the bottom of the hopper 110 and provides them to an opening device 125; in turn, the opening device 125 opens each signature 115 and places it astride a fixed saddle 130. The fixed saddle 130 conveys the signatures 115 to a sewing station 135. Particularly, the signatures 115 cross a shaping station 140 and then reach a launching wheel 145, which accelerates each signature 115 so as to separate it from the previous ones and throw it individually over a movable saddle 150 of the sewing station 135 (in an open position aligned with the fixed saddle 130). Once the signature 115 has been loaded astride the movable saddle 150, the latter is raised to bring it towards a closed (sewing) position under a sewing head (not shown in the figure); the sewing head sews the signature 115 loaded on the movable saddle 150 with continuous (sewing) threads, starting a new book block if the signature 115 is the first one thereof or adding the signature 115 to a book block under formation otherwise; the movable saddle 150 then returns to the open position (by slipping out of the signature 115 just sewn) to repeat the same operations continually. As soon as each book block has been completed, the threads are cut to separate the book block therefrom. The book blocks so obtained, denoted with the reference 155, are deposited in succession onto an output conveyor 160 (to be provided to further bookbinding machines, not shown in the figure, which complete the corresponding books). A motor, not visible in the figure, drives the various (mechanical) members of the sewing machine 100 by means of corresponding transmission systems. Operation of the entire sewing machine 100 is managed by a control system 165 (for example, based on an industrial PC).

With reference now to FIG. 2A-FIG. 2E, a pictorial representation is shown in cross-section of a thread-clamp 200 according to an embodiment of the present disclosure in different operating conditions.

Figure 2A:
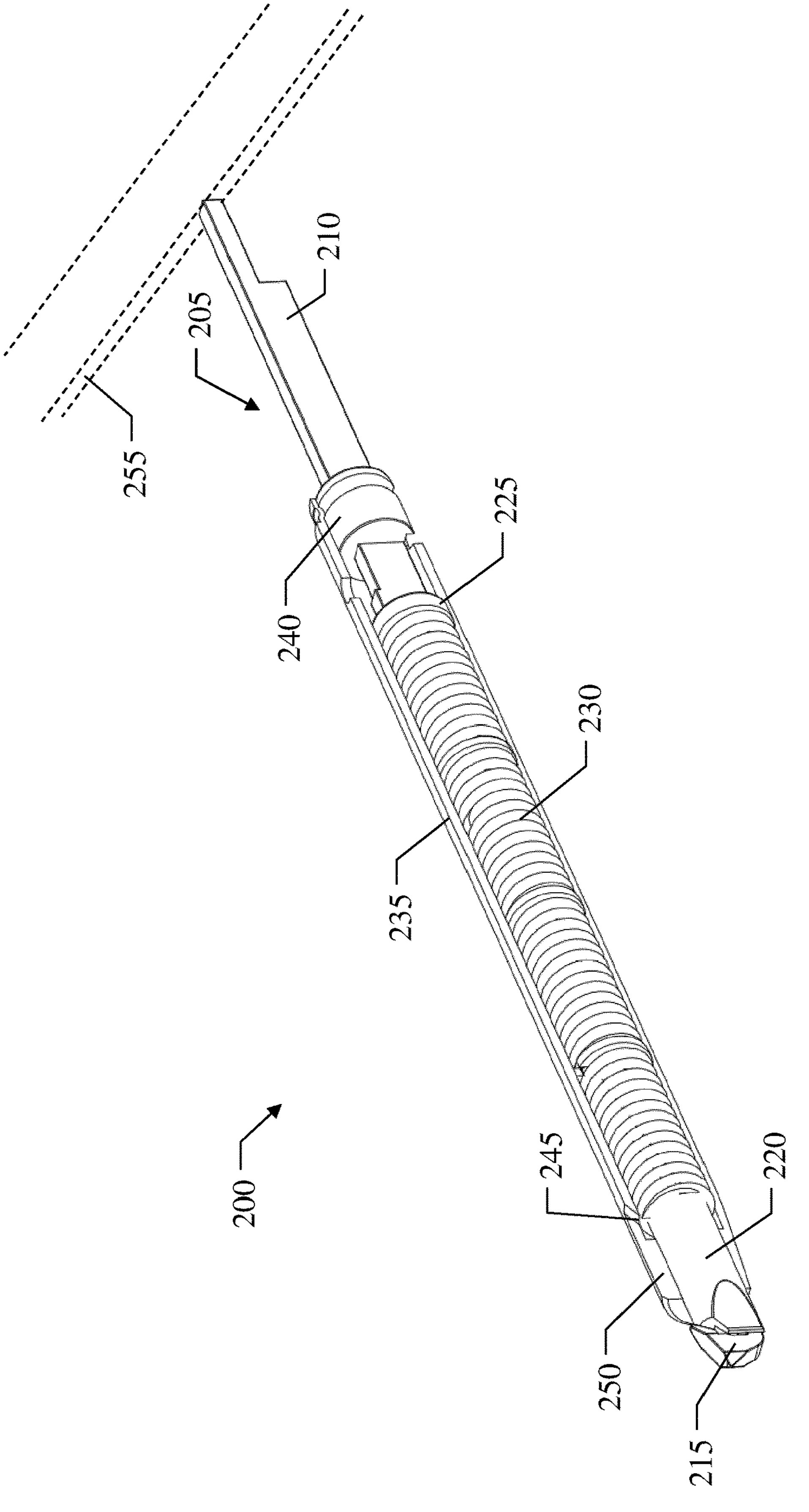
FIG. 2A-FIG. 2E show a pictorial representation in cross-section of the thread-clamp according to an embodiment of the present disclosure in different operating conditions.

Starting from FIG. 2A, the thread-clamp 200 comprises a crochet 205, which has a stem 210 (for example, with rectangular cross-section) terminating at its front end with a hook 215 facing backwards. A body, for example, shaped like a bush 220 is slidably mounted onto the stem 210. The bush 220 has a (narrower) main portion that widens at a rear end thereof to form an (interference) collar and it has an abutment wall for the hook 215 (i.e., for an inner wall thereof facing it) at a front end thereof; the bush 220 is provided with a through hole matching the stem 210 (for its sliding). The stem 210 has a (stop) disk 225 at a non-zero distance from a rear end thereof (for example, 20-40% of its length); the disc 225 has the same size and it is coaxial with the collar of the bush 220. A spring 230 (or more) is mounted around the stem 210, between the collar of the bush 220 and the disc 225; the spring 230 is preloaded, so as to push the bush 220 and the disk 225 away from each other.

Moreover, the thread-clamp 200 comprises a sleeve 235, which has an inner diameter matching the collar of the bush 220 and the disc 225 and it has a length substantially equal to that of a portion of the crochet 205 from the hook 215 to the disk 225 (slightly higher than it). The sleeve 235 is provided with a (closure) base 240 at a rear end thereof; the base 240 has a through hole matching the stem 210 (with non-circular cross-section, so as to prevent its rotation). Moreover, the sleeve 235 is provided with a (stop) ring 245 in retracted position with respect to its front end (for example, at a distance therefrom slightly lower than a length of the main portion of the bush 220); the ring 245 has an inner diameter matching the main portion of the bush 220. In this way, a cavity 250 is defined by a portion of the sleeve 235 behind the ring 240 (outside); a slit (not visible in the figure) is formed along this portion of the sleeve 235, so as to leave the cavity 250 open at the top. An assembly formed by the hook 205, the bush 220 and the spring 230 is slidably mounted into the sleeve 235. Particularly, an inner portion of the assembly comprising the collar of the bush 220, the spring 230 and a corresponding portion of the stem 210 comprising the disc 225 is arranged between the ring 245 and the base 240; in view of above, the distance between the base 240 and the ring 245 is slightly higher than the length of the inner portion of the assembly 205,220,230 with the spring 230 in a rest condition (for example, by 1-2 mm), so that the inner portion of the assembly 205,220,230 is free to slide accordingly along the sleeve 235. At the same time, the bush 220 crosses the ring 245 (with its main portion that projects into the cavity 250) and the stem 210 crosses the base 240 (with a free portion thereof behind the disk 225, at the opposite side of the hook 215, which projects outside the sleeve 235).

A driving mechanism 255 of the sewing machine (shown in dashed lines in the figure) is used to drive the thread-clamp 200. For example, the driving mechanism 255 comprises a common (support) bar for all the thread-clamps 200, which support bar implements an actuation mechanism for actuating the thread-clamps 200 in synchrony and a movement mechanism for moving the thread-clamps 200 together. Particularly, in a rest condition wherein the actuation mechanism (referred to with the same number 255) does not act on the stem 210, the spring 230 (preloaded so as to push the collar of the bush 220 and the disk 225 of the stem 210 away from each other) maintains the hook 215 in contact with the abutment wall of the bush 220 (just outside the sleeve 235); in this condition, the thread-clamp 200 is then closed. Alternatively, the actuation mechanism 255 comprises a piston for each thread-clamp 200 that is coupled with its stem 210 for operating it individually.

Figure 2B:
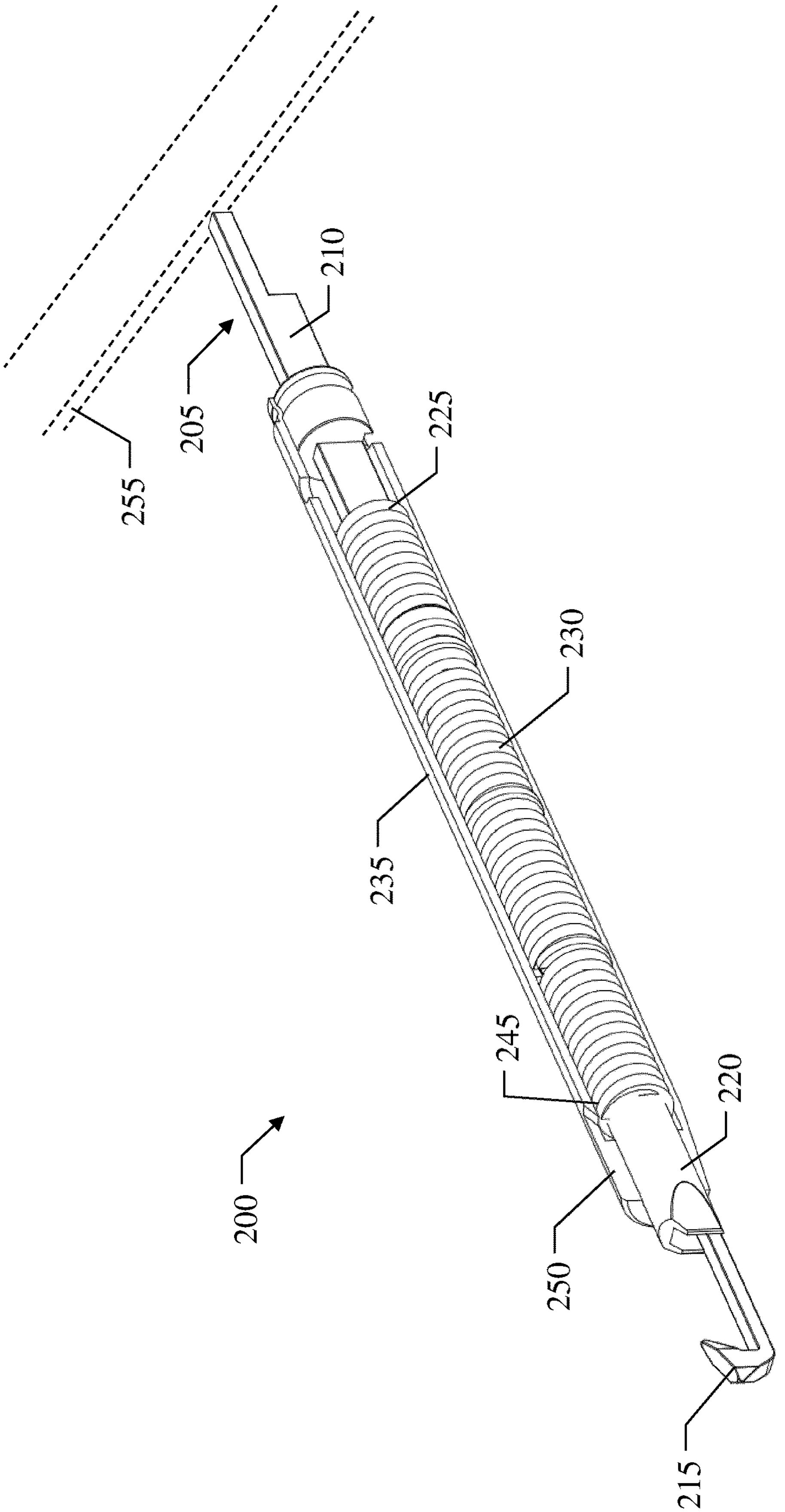

Moving to FIG. 2B, the actuation mechanism 255 acts on the thread-clamp 200 to open it by moving the hook 205 forwards with respect to the sleeve 235 (for example, by pushing the stem 210 while the sleeve 235 is maintained stationary). As a consequence, the assembly 205,220,230 moves forwards freely along the sleeve 235 until the collar of the bush 220 reaches the ring 245, abutting against it (with the main portion of the bush 220 projecting into the cavity 250); at this point, the hook 205 moves in opposition to the spring 230, which is further compressed between the bush 220 (blocked by the ring 245) and the disc 225. As a result, the hook 215 moves away from the abutment wall of the bush 220 (for example, by 4-12 mm), projecting forwards.

In use, the thread-clamp 200 in the open condition hooks a corresponding thread (not shown in the figure) being tighten transversely to it. Particularly, when the hook 215 (advancing) reaches the thread, the hook 215 lifts the thread above it; as soon as the hook 215 has passed the thread, the hook 215 clears the thread that elastically returns to its previous position resting onto the stem 210 (behind the hook 215). At this point, the thread-clamp 200 is closed by moving the crochet 205 backwards with respect to the sleeve 235 (for example, by ceasing the push of the stem 210). As a consequence, the spring 230 pushes the crochet 205 backwards (by acting onto the disc 225), until the hook 215 abuts against the abutment wall of the sleeve 220 thereby returning to the closed condition of FIG. 2A. The thread (resting on the stem 210) is then tightened between the hook 215 and the abutment wall of the bush 220 (which act as a pair of pliers, or a clamp), thereby remaining blocked between them.

Figure 2C:
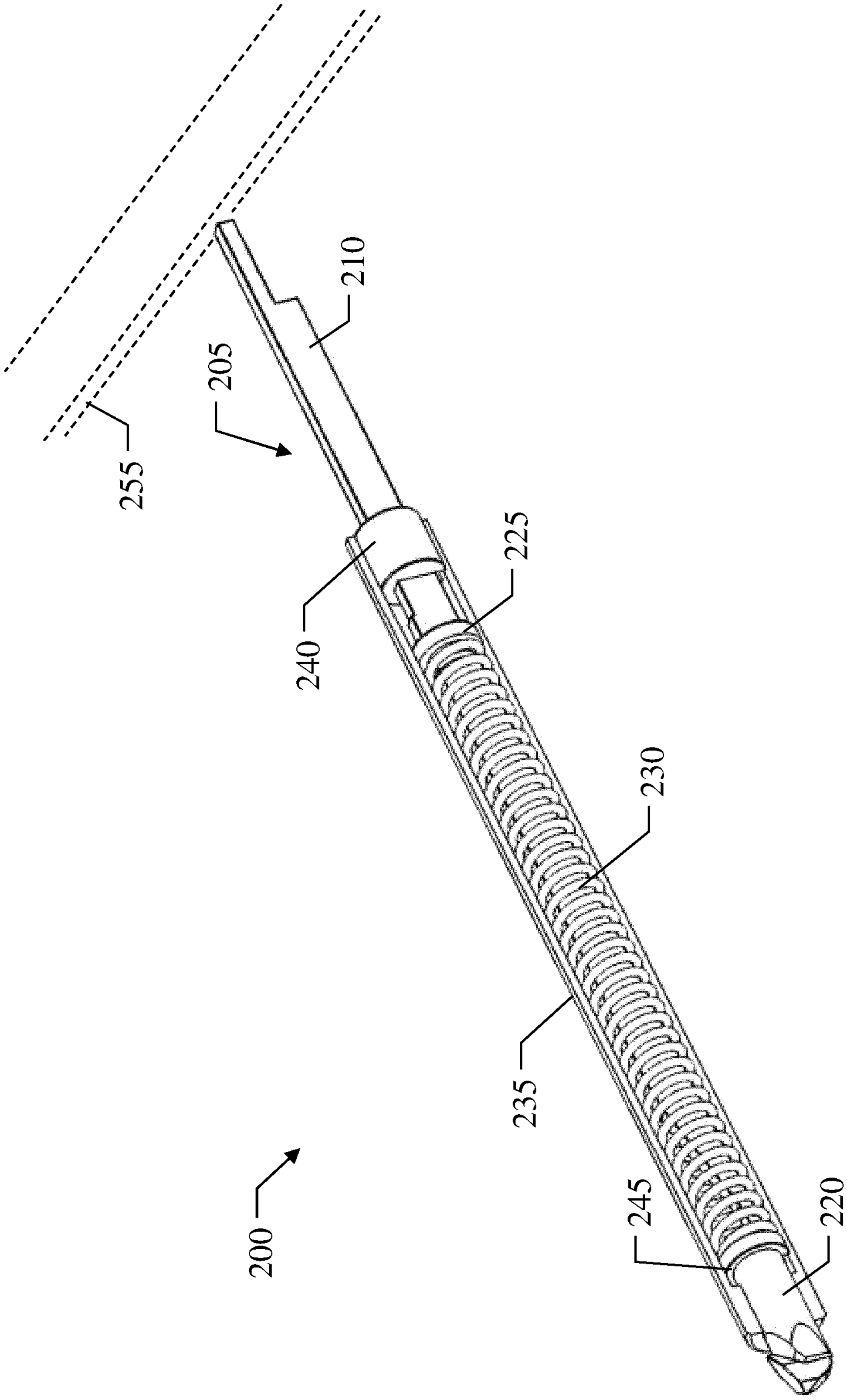

Moving to FIG. 2C, the actuation mechanism 255 may also act on the thread-clamp 200 in the closed condition to move the crochet 205 slightly backwards with respect to the sleeve 235 (for example, by pulling the stem 210 while the sleeve 235 is maintained stationary), thanks to the free room that remains between the disc 225 and the base 240. In this way, the thread-clamp 200 is brought into a safety condition, wherein the collar of the bush 220 is spaced apart from the ring 245 accordingly. This avoids (or at least substantially reduces) the risk that possible vibrations might cause the opening of the thread-clamp 200 with the loss of the thread. Indeed, at least until the collar of the bush 220 does not reach the ring 245, these vibrations may at most make the assembly 205,220,230 slide along the sleeve 235, but they may not compress the spring 230 since the bush 220 does not abut against the ring 245.

Figure 2D:
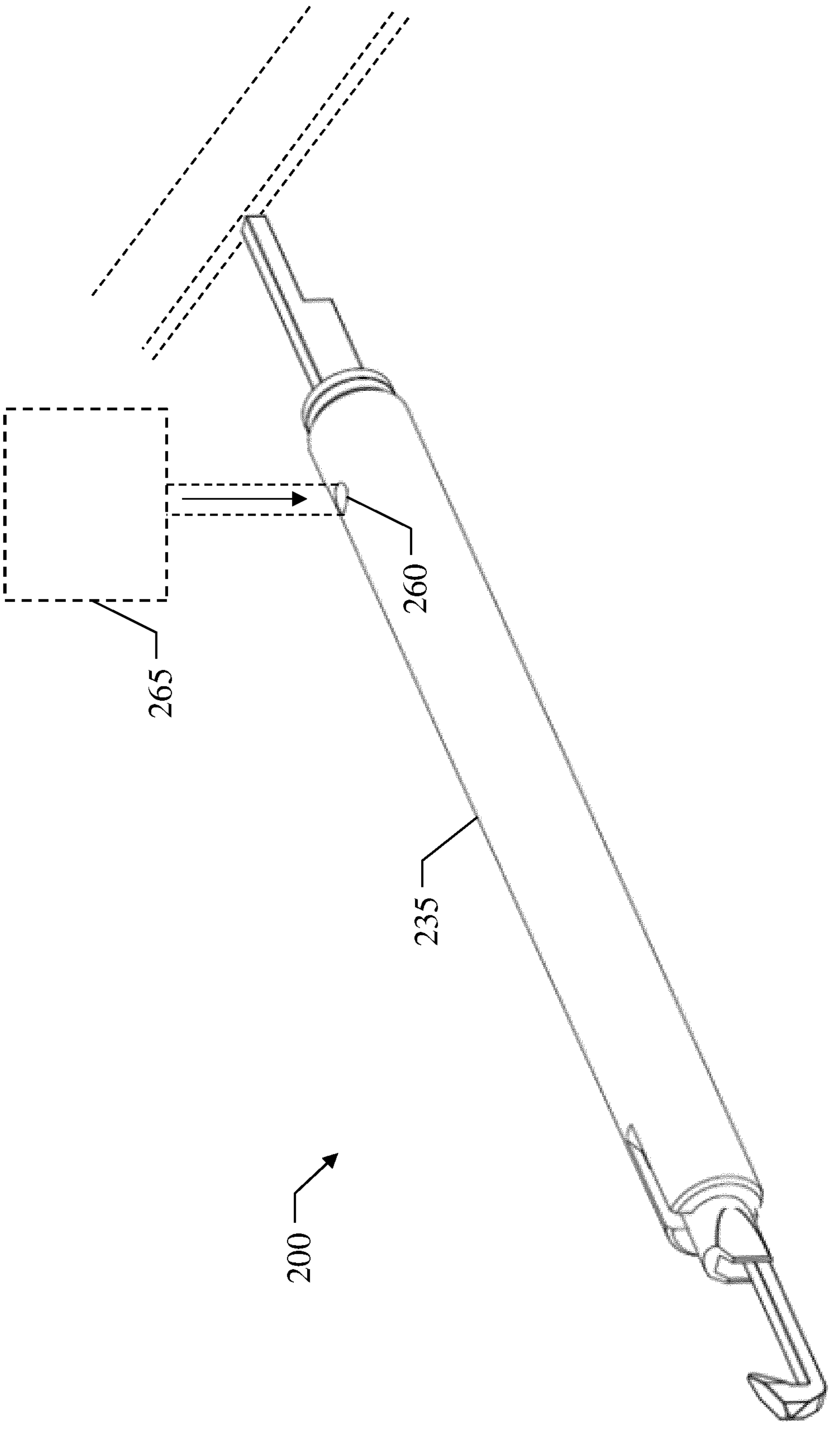

Moving to FIG. 2D, in the solution according to an embodiment of the present disclosure, the sleeve 235 has an inlet 260 at its rear end for receiving a gas jet, for example, an air blast (as shown by an arrow in the figure). A blasting system 265 of the sewing machine (shown in dashed lines in the figure) provides this air blast. For example, the blasting system 265 comprises a common pump that delivers the air blast to all the thread-clamps 200 of the sewing machine via corresponding pipes that are connected to their inlets 260. The blasting system 260 is configured to provide the air blast with duration, flow and pressure that are pre-determined or that may be customized by an operator via the control system of the sewing machine.

Figure 2E:
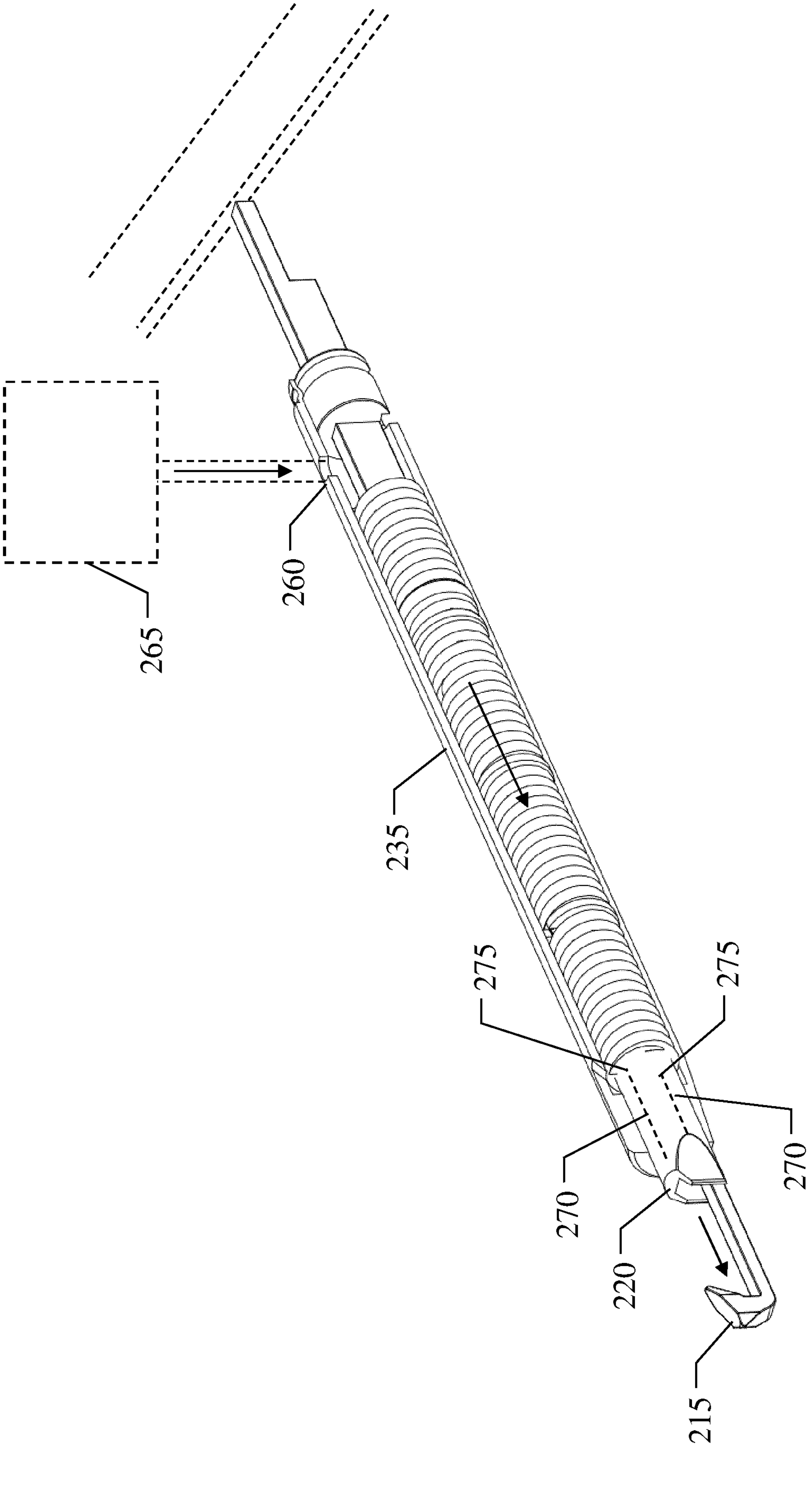

Moving to FIG. 2E, the bush 220 has one or more (conveying) channels 270 for the air crossing it longitudinally (for example, in the form of micro-perforations); particularly, each channel 270 extends from an inlet 275 at the collar of the bush 220 to an outlet at the abutment wall of the bush 220 (not visible in the figure). In this way, the air blast provided by the blasting system 265 is conveyed from the inlet 260 across the sleeve 235 (i.e., its hollow) until reaching the bush 220; the air then enters the channels 270 at their inlets 275 and exits them at their outlets, so as to be conveyed towards the hook 215 (as shown by the arrows in the figure).

In operation, the blasting system 265 is turned on when the thread-clamp 200 is open. Therefore, the air blast directed towards the hook 215 cleans it by removing any dirt that might be present thereon.

Indeed, dirt might deposit in the sewing station during operation of the sewing machine (for example, because of dust coming from the paper of the signatures or because of microfibers coming from the threads). Particularly, the amount of dirt due to the threads mainly depends on their material; for example, threads with a high content of cotton generate more dirt since the fibers of the threads detach more easily during the mechanical processes of their delivering.

The proposed solution instead allows preventing the accumulation of dirt in a gripping seat (between the hook 215 and the abutment wall of the bush 220) where the thread is to be gripped; this avoids (or at least substantially reduces) the risk that any dirt in the gripping seat might create a thickness reducing a gripping force on the thread. All of the above improves the performance of the thread-clamp 200, and particularly its reliability. This has a beneficial effect on operation of the thread-clamp 200, and then of the whole sewing machine.

Moreover, the same solution further increases a life of the thread-clamp 200. Indeed, this avoids that any accumulation of dirt at the hook 215 might prevent a complete return thereof into its gripping seat and then cause a premature wear. As a result, it is possible to reduce a length and a frequency of maintenance operations on the sewing machine; this accordingly reduces the downtimes of the sewing machine (especially important in high-speed automated bookbinding lines).

The proposed solution allows using standard threads. This is particularly advantageous in operative conditions wherein special threads that create less dirt, such as threads with a high synthetic content or treated with silicone, may not be used (for example, with particular types of paper, productions or operative speeds).

The thread-clamps of the proposed solutions are of general applicability; particularly, they are readily interchangeable with the previous thread-clamps (i.e., without the air blast).

Figure 3B:
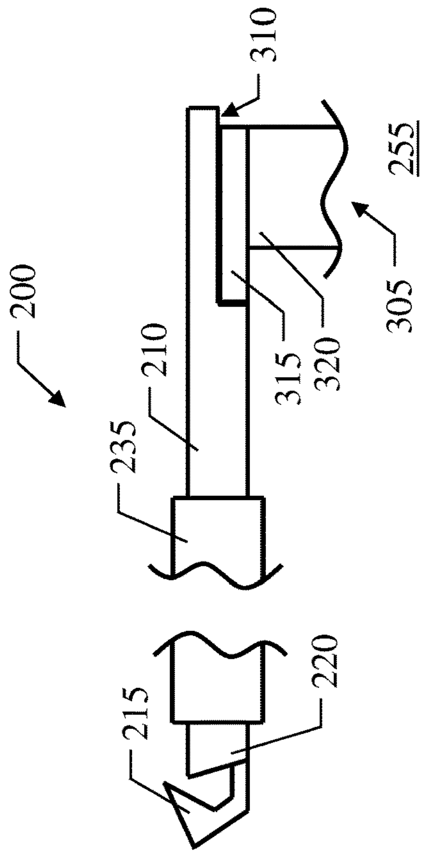
FIG. 3A-FIG. 3B show a schematic representation of a disabling mechanism of the thread-clamp according to an embodiment of the present disclosure in different operating conditions.
Figure 3A:
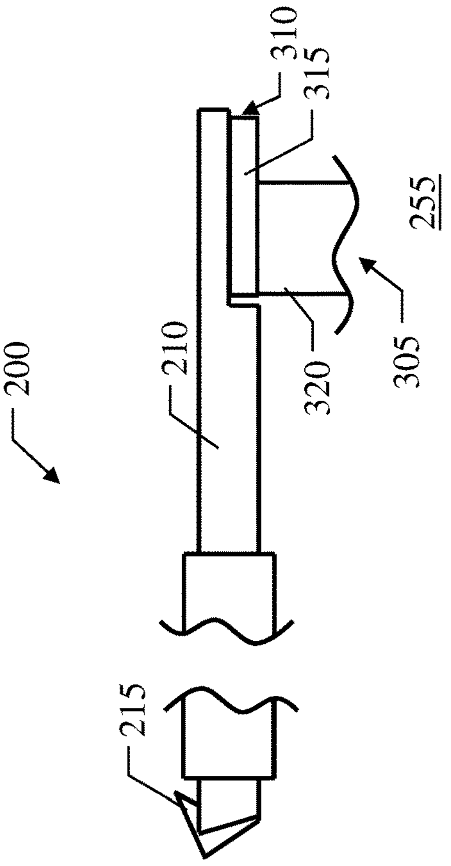

With reference now to FIG. 3A-FIG. 3B, a schematic representation is shown of a disabling mechanism 305 of the thread-clamp 200 according to an embodiment of the present disclosure in different operating conditions.

Starting from FIG. 3A, the stem 210 ends at its rear end (opposite the hook 215) with a recess 310 (for example, in lower position). The disabling mechanism 305 of the clamp-thread 200 (part of its actuation mechanism 255) comprises a (push) disc 315 arranged in the recess 310; the disc 315 is mounted in an eccentric (offset) way onto a shaft 320. Normally, the disabling mechanism 305 is off (as shown in the figure), with the disc 315 arranged with a portion thereof projecting from the shaft 320 facing outwards the recess 310; in this condition, the disc 315 does not interfere with the stem 210 and thus with the functioning of the thread-clamp 200.

Moving to FIG. 3B, the disabling mechanism 305 is turned on by rotating the shaft 320 by 180°. In this way, the protruding portion of the disc 315 is now facing inwards the recess 310; as a consequence, the disc 315 pushes the stem 210 towards the sleeve 235 (held stationary), thereby causing the hook 215 to move away from the abutment wall of the bush 220. In this way, even when the actuation mechanism 255 commands the thread-clamp 200 to close it (i.e., in the rest condition without pushing the stem 210), nevertheless the thread-clamp 200 remains open.

The above-described thread-clamp with the air blast may have a variety of applications that significantly improve operation of the sewing machine.

Figure 4:
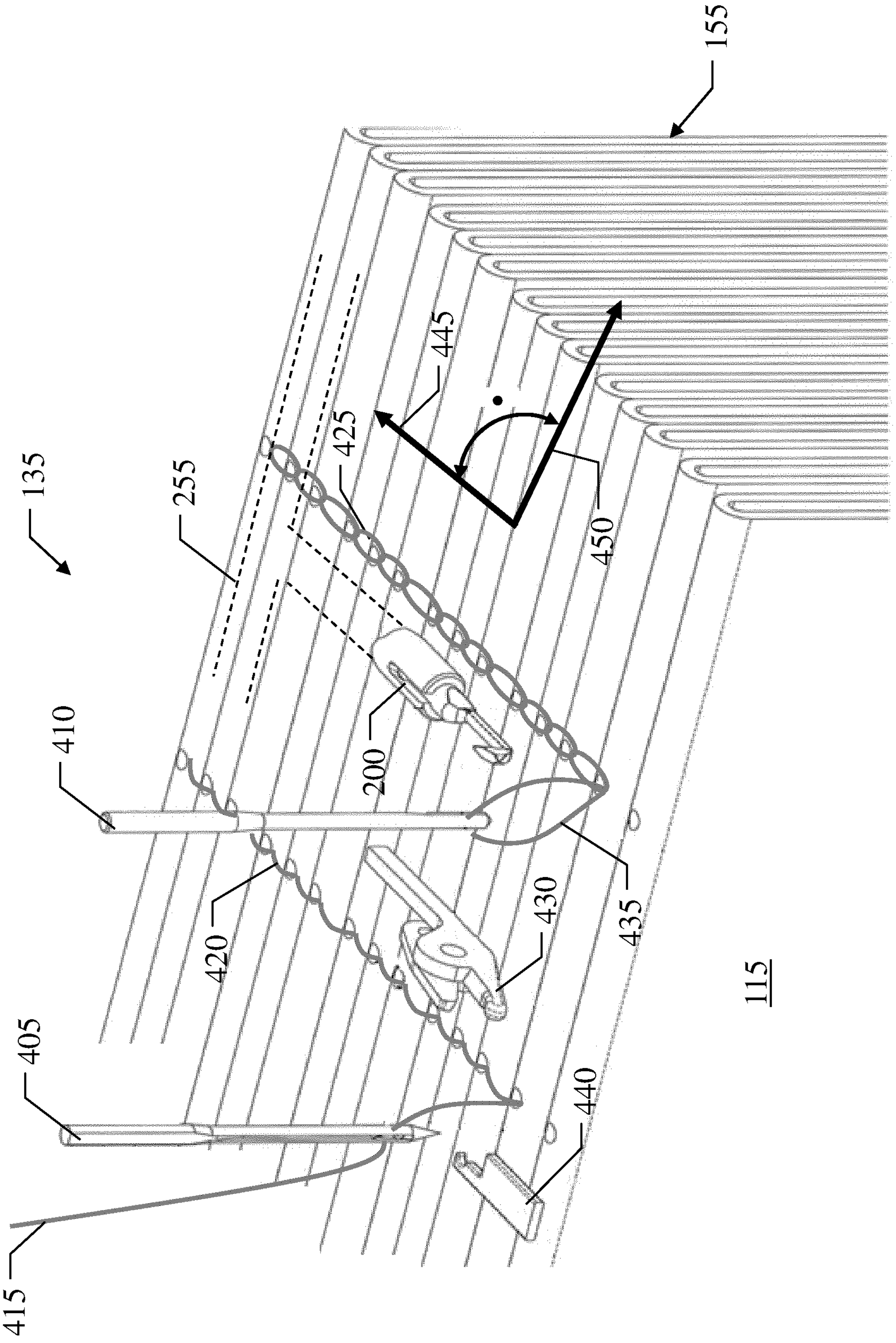
FIG. 4 shows an example of application of the thread-clamp according to an embodiment of the present disclosure.

With reference in particular to FIG. 4, an example is shown of application of the thread-clamp 200 according to an embodiment of the present disclosure.

Particularly, the thread-clamp 200 is used in the sewing station 135 for completing the book blocks 155 without blind stiches. The sewing station 135 comprises a series of needles 405 and a series of crochets 410 alternated to each other (for example, 8-15 pairs each formed by a needle 405 and a following crochet 410, for example, to the right, only one of them shown in the figure). Each needle 405 is formed by a stem that ends with a tip provided with an eye for inserting a corresponding (sewing) thread 415, which is supplied continuously (for example, by a corresponding spool not shown in the figure); each crochet 410 is formed by a similar stem that instead ends with a hook for hooking a corresponding thread 415. The needles 405 and the crochets 410 cooperate to convey the threads 415 through the signatures 115 so as to form one or more stitchings that bridge between them; particularly, the stitchings comprise one or more rows of plain stitches 420 (formed by the needles 405) and one or more rows of looped stitches 425 (formed by the crochets 410), which are concatenated to each other. Moreover, the sewing station 135 comprises a series of cutters 430 (only one of them shown in the figure), each for cutting a corresponding thread 415 at the end of each book block 155.

At the beginning of the sewing of each book block 155, the threads 415 (coming from the corresponding spools) cross the eye of the corresponding needles 405 and end with corresponding free tails (because just inserted into the needles 405 at the beginning of a job or because cut at the end of the sewing of a previous book block 155), while the hook needles 410 are free; later on, the threads 415 extend from the corresponding needles 405 to the corresponding plain stiches 420 formed onto a preceding signature 115, while corresponding free loops 435 previously formed by the threads 415 are held by the crochets 410. The sewing station 135 may implement a normal stitching technique (wherein each needle 405 always cooperates with the following crochet 410) or a staggered stitching technique (wherein each needle 405 alternately cooperates with a preceding crochet 410 and with a following crochet 410, to the left and to the right, respectively). In any case, once a last signature 115 of each bock block 155 has been sewn, the book block 155 is separated from the threads 415 by cutting them.

For this purpose, the sewing station 135 comprises a series of (auxiliary) shuttles 440 (only one of them shown in the figure), each for carrying a corresponding thread 415 from the needle 405 to the following crochet 410 above the movable saddle (not shown in the figure). In addition, the sewing station 135 comprises a series of corresponding thread-clamps 200 (only one of them shown in the figure), each for blocking and pulling a corresponding thread 415. The thread-clamps 200 are mounted onto the driving mechanism 255 (for example, in the implementation based on the common support bar), which is arranged above the movable saddle in its closed position, so that in rest condition each clamp-thread 200 is beyond a corresponding crochet 410 along an advancement direction 445 of the book block 155 during their sewing (backwards in the figure), slightly below its tip; the driving mechanism 255 implements the actuation mechanism described above and the movement mechanism for translating the thread-clamps 200 horizontally, in parallel and transversely to the advancement direction 445.

For each stitching, once a last signature 115 of the book block 155 has been sewn the thread 415 extends from the last signature 115 to the spool passing through the eye of the needle 405 while its free loop 435 is held by the crochet 410. At this point, the shuttle 440 is translated towards the crochet 410 (rightwards in the figure); particularly, the shuttle 440 hooks the thread 415 (between the last signature 115 and the needle 405) and pulls it (from the spool) to an (intermediate) position behind the free loop 435, along the advancement direction 445 (for example, 1-3 mm from it). As a result, a displacement of the shuttle 440 (and then of the thread 415 as well) as the crow flies extends in a direction 450 that is oblique to the advancement direction 445 (backwards), so as to form with it an angle $\alpha$ higher than 90° (such as of the order of 95°-125°, preferably 100°-120° and still more preferably 105°-115°, like 110°); for example, this result may be achieved with a movement of the shuttle 440 along an 5-like path, i.e., perpendicular, opposite and then perpendicular again to the advancement direction 445.

Subsequently, the thread-clamp 200 is actuated to open and it is translated contrary to the advancement direction 445 (forwards in the figure), so as to be inserted into the free loop 435 up to hook the thread 415 (for example, going beyond it by 1-2 mm). The thread-clamp 200 is the actuated to close so as to block the thread 415 at a (gripping) point thereof. The thread-clamp 200 is then moved along the advancement direction 445 (backwards in the figure) so as to be extracted from the free loop 435 (for example, moving away by 1-3 mm from it). As a result, a (closing) portion of the thread 415, comprising the gripping point, is brought within the free loop 435; the closure portion of the thread 415 is downstream the plain stitches 420 along their formation direction (i.e., from the plain stitches 420 to the needle 405), opposite the direction of unwinding of the thread 415 from the spool. After the sewing of the next block of signatures has been started, the cutter 430 is actuated, so as to cut the thread 415. After that, the thread-clamp 200 is translated laterally away from the crochet 210 (to the opposite side of the needle 405, rightwards in the figure) for a distance almost equal to the distance between the needle 405 and the crochet 410; as a consequence, the (cut) thread 415 is pulled (without sliding with respect to the thread-clamp 200 that blocks it) so as to tighten the free loop 435 around it. Subsequently, the thread-clamp 200 is actuated to open (at least partially, for example, by moving the hook away from the abutment wall of the bush for a reduced extent), thereby releasing the thread 415 that slips out thereof. The blasting system is turned on when the thread-clamp 200 is in this condition (i.e., at least partially open without hooking any thread 415), so as to clean the hook without interfering with operation of the sewing machine.

The same operations are performed for both the normal stitching technique and the staggered stitching technique. However, in the latter case, the thread 415 of the last needle 405 is not gripped and pulled, by disabling the actuation of the corresponding thread-clamp 200; for example, when all the thread-clamps 200 are actuated together, this result is achieved by turning on the corresponding disabling mechanism (not shown in the figure). Indeed, in this case the thread 415 does not form any free loop, so that if the thread 415 was pulled there would be a risk of tearing it. As a consequence, the (cut) thread 415 is simply left free outside the last signature 115.

In addition or in alternative, the same thread-clamps 200 may be used to park the threads 415 inserted in the needles 405. This function may be implemented in the same sewing station 135 described above, or in a simplified version thereof without the shuttles 440. Particularly, for each thread 415 whose use is not expected in the near future (for example, when a current job has been completed and a next job involves the sewing of signatures 115 of a different format, or when a work shift is over), the thread-clamp 200 is actuated to open and the free tail of the thread 415 projecting from the needle 405 is hooked by it; the thread-clamp 200 is then actuated to close thereby blocking the thread 415. In this way, the threads 415 that are not used (in the next job or during a stop period of the sewing machine) are parked in the corresponding needles 405 (where they are kept firmly in place by the corresponding thread-clamps 200). Moreover, when the sewing station implements the above-described technique for completing the book blocks without blind stitches, if the actuation mechanism controls the thread-clamps 200 together, all of them are actuated to open at the end of each book block; in this case, any thread-clamps 200 that block the threads 415 being parked since they are not used are disabled during operation of the sewing machine, so as to avoid losing them (for example, as above by turning on the corresponding disabling mechanisms). In any case, whenever any threads 415 being parked are to be used again (for example, when a new job involves the sewing of signatures 115 of a different format or when a new work shift is started) the corresponding thread-clamps 200 are actuated to open and thereby releasing the threads 415. This significantly reduces the time required to set up the sewing machine (for example, between different jobs and between different work shifts), with a corresponding increase in its yield, especially in the case of many jobs of small size.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms “substantially”, “about”, “approximately” and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a gripping device for gripping a sewing thread in a bookbinding sewing machine. However, the gripping device may be used for any purpose (for example, for completing book blocks without blind stiches, for parking the sewing threads and so on) in any bookbinding sewing machine (see below).

In an embodiment, the gripping device comprises a crochet having a hook for hooking the sewing thread. However, the crochet may be of any type (for example, with a stem having any cross-section, such as prismatic, circular and the like, with a hook having any shape, such as fishhook-like, catch-like and the like, and so on).

In an embodiment, the gripping device comprises a body having an abutment wall for the hook. However, the body may be of any type (for example, shaped like a bush, a prism and so on) with any abutment wall for the hook (for example, narrower, equal or wider than the hook, either made in a seat for receiving the hook, at least in part, or not, and so on).

In an embodiment, the body and the crochet are slidable reciprocally along a longitudinal direction of the crochet. However, this result may be achieved in any way (for example, with the crochet crossing the body, sliding along am external channel thereof, and so on).

In an embodiment, the body and the crochet are slidable between an open condition wherein the hook is distal from the abutment wall of the body for hooking the sewing thread and a closed condition wherein the hook is proximal to the abutment wall of the body for blocking the sewing thread. However, this result may be achieved in any way (for example, with the hook in the open condition that is at any distance from the abutment wall, the hook in the closed condition that is either in contact or slightly separated from the abutment wall according to the thickness of the sewing thread pressed between them, and so on).

In an embodiment, the body has one or more inlets for receiving a gas jet. However, the inlets may be in any number, of any shape and arranged at any position (for example, on a rear surface, laterally and so on); moreover, the gas jet may be of any type (for example, air, ionized air, nitrogen and so on) and it may be received in any way (for example, through the sleeve, directly and so on).

In an embodiment, the body has one or more corresponding channels crossing the body between the inlets and the abutment wall for conveying the gas jet towards the hook. However, the channels may be in any number (either the same or different with respect to the inlets) and of any type (for example, with size and/or shape either the same or different with respect to the ones of the inlets, and so on).

Further embodiments provide additional advantageous features, which may however be omitted at all in a basic implementation.

Particularly, in an embodiment the gripping device comprises biasing means for biasing the body and the crochet to the closed condition at rest. However, the biasing means may be implemented in any way (for example, with elastic elements pushing or pulling the crochet, a catching element blocking it and so on); in any case, the possibility is not excluded of biasing the gripping device to the open condition at rest or of avoiding any biasing.

In an embodiment, the crochet is provided with a stop element. However, the stop element may be of any type (for example, a disc, one or more teeth, and so on).

In an embodiment, the biasing means comprise elastic means acting between the body and the stop element to push the body and the crochet away to each other at rest (with the body and the crochet that are slidable reciprocally towards the open condition in opposition to the elastic means). However, the elastic means may be implemented in any way (for example, with one or more springs, cylinders of rubber and so on).

In an embodiment, the gripping device comprises a further body having a further stop element for blocking the body in abutment. However, the further body may be of any type (for example, a sleeve, a half-pipe and so on) with any further stop element (for example, a ring, one or more teeth, and so on).

In an embodiment, the gripping device is bought to the open condition in response to a push of the crochet against the body being blocked by the further stop element. However, the crochet may be pushed against the body in any way (for example, acting on its rear end, on a tooth projecting from a longitudinal slit of the sleeve and so on).

In an embodiment, the further body and an assembly (comprising the crochet, the body and the elastic means) are slidable reciprocally between the closed condition and a safety condition, wherein the further stop element does not interfere with the body for preventing the passage to the open condition. However, the safety condition may be defined in any way (for example, by any non-zero distance between the body and the further stop element, and so on).

In an embodiment, the further body comprises a sleeve having the further stop element at a first end thereof and a closure base at a second end thereof. However, the sleeve may be of any type (for example, with a circular, square and the like section, with any length and so on), with the further stop element and the closure base at any position (for example, at any distance from the ends of the sleeve and so on).

In an embodiment, the body comprises a main portion and an interference element. However, the main portion and the interference element may be of any type (for example, with any length and width, either in absolute or relative terms, with the interference element implemented by a disc, one or more protrusions, and so on).

In an embodiment, an inner portion of the assembly (comprising the interference element of the body, the elastic means and a corresponding portion of the crochet comprising the stop element) is arranged between the further stop element and the closure base. However, the assembly may be arranged in any way (for example, inside or outside the sleeve, and so on).

In an embodiment, the main portion of the body projects at least partly outside the sleeve through the further stop element. However, the main portion of the body may project outside the sleeve to any extent (down to zero).

In an embodiment, the sleeve has a further inlet at the first end thereof for receiving the gas jet (with the sleeve that conveys the gas jet from the further inlet to the inlets). However, the further inlet may be arranged at any position along the sleeve for conveying the gas jet in any way (for example, through its hollow containing the corresponding portion of the assembly, one or more dedicated channels and so on).

In an embodiment, the closure base has a through hole for the sliding of the crochet. However, this result may be achieved in any way (for example, even without any closure base with a simple stop element for the hook).

In an embodiment, the crochet has a free portion opposite the hook projecting outside the sleeve through the through hole for moving the crochet among the safety condition, the closed condition and the open condition. However, this free portion may have any extent.

In an embodiment, a distance between the further stop element and the closure base is higher than a length of the internal portion of the assembly. However, the corresponding difference may have any value (in terms either absolute or relative).

In an embodiment, the further stop element is arranged at a non-zero distance from the first end of the sleeve thereby defining a corresponding cavity for receiving the main portion of the body. However, this distance may have any value (in terms either absolute or relative) to define any cavity (even without any slit), down to none.

An embodiment provides a bookbinding sewing machine for sewing signatures into book blocks. However, the bookbinding sewing machine may be of any type (for example, opening signatures already formed, folding flat sheets to form the signatures, with both functions, and so on), for sewing signatures of any type (for example, simple, overlapped and so on) into book blocks of any type (for example, each one comprising any number of signatures, with the addition of other elements, such as inserts, and so on).

In an embodiment, the bookbinding sewing machine comprises one or more gripping devices as above. However, the gripping devices may be in any number (for example, for each pair of needle/crochet a single gripping device for completing the book blocks without blind stiches and possibly parking the corresponding sewing thread, two gripping devices for completing the book blocks without blind stiches and for parking the corresponding sewing thread, respectively, and so on).

In an embodiment, the bookbinding sewing machine comprises blasting means for providing the corresponding gas jet to each of the gripping devices. However, the blasting means may be implemented in any way (for example, with a single pump for all the gripping devices, with multiple injectors each for a single gripping device or a group of two or more of them, and so on).

Further embodiments provide additional advantageous features, which may however be omitted at all in a basic implementation.

In an embodiment, the bookbinding sewing machine comprises one or more needles and one or more further crochets for forming one or more stitchings between the signatures of each of the book blocks by corresponding sewing threads. However, the needles and the crochets may be in any number (either the same or different) for forming any number of stitchings with corresponding sewing threads of any type (for example, synthetic, natural and so on).

In an embodiment, the stitchings comprise one or more corresponding plain stitches formed by the needles and one or more corresponding looped stitches formed by the crochets concatenated to each other (the looped stitches ending with corresponding free loops on a last one of the signatures of each completed one of the book blocks). However, the plain stiches and the looped stitches may be formed in any way (for example, only with the normal stitching technique, only with the staggered stitching technique, selectively with both of them and so on).

In an embodiment, the bookbinding sewing machine comprises one or more shuttles corresponding to the sewing threads, each for bringing the corresponding sewing thread downstream the corresponding plain stitches along a formation direction thereof to an intermediate position aligned with the corresponding free loop along the advancement direction. However, the shuttles may be of any type (for example, mechanical, pneumatic and so on), each for bringing the corresponding sewing thread to any intermediate position (for example, behind or in front of the free loop, at any distance from it along the advancement direction, moving obliquely by forming any angle other than 90° with respect to the advancement direction, along a linear or non-linear path, and so on).

In an embodiment, the bookbinding sewing machine comprises the gripping devices corresponding to the sewing threads, each for bringing a closing portion of the corresponding sewing thread from the intermediate position through the corresponding free loop along the advancement direction (the closing portion consisting of a portion of the sewing thread downstream the corresponding plain stitches along the formation direction thereof). However, the closing portion of each sewing thread may be brought through the free loop in any way (for example, by hooking it at any distance from the free loop, pulling it through the free loop to any distance therefrom and so on).

In an embodiment, the bookbinding sewing machine comprises an actuation mechanism for actuating the gripping devices each to block the corresponding sewing thread at a gripping point comprised in the closing portion thereof. However, the actuation mechanism may be of any type (for example, a common one for actuating all the gripping devices together, corresponding ones for actuating the gripping devices individually, acting to open the gripping devices when closed at rest, acting to close the gripping devices when open at rest, acting to both open and close the gripping devices, and so on) and it may be controlled for this purpose in any way (for example, opening the gripping device when normally closed to hook the sewing thread, hooking the sewing thread directly when the gripping device is normally open, closing the gripping device at any position, either before or after bringing the closing portion of the sewing thread through the free loop, and so on).

In an embodiment, the bookbinding sewing machine comprises one or more cutters corresponding to the sewing threads each for cutting the corresponding sewing thread being blocked downstream the gripping point thereof along the formation direction of the plain stitches. However, the cutters may be of any shape (for example, scissors-like, with telescopic structure and so on) and type (for example, active, passive and so on), and they may be used to cut the sewing threads in any way (for example, at any distance from the gripping point and so on).

In an embodiment, the bookbinding sewing machine comprises a moving mechanism for moving the gripping devices (each blocking the corresponding sewing thread being brought through the corresponding free loop) to pull the sewing thread being cut away from the free loop thereby tightening the free loop around the sewing thread. However, the moving mechanism may be of any type (for example, a common one for moving all the gripping devices together, corresponding ones for moving the gripping devices individually, and so on) for pulling the sewing threads in any way (for example, in any direction, to any extent and so on).

In an embodiment, the bookbinding sewing machine comprises the actuation mechanism for bringing the gripping devices each to the open condition thereby releasing the corresponding sewing thread being pulled. However, the gripping devices may be open in any way (see above) to release the sewing thread at any time after the free loop has been tightened (before it might interfere with the advancement of the corresponding book block).

In an embodiment, the bookbinding sewing machine comprises disabling means for disabling each gripping device individually. However, the disabling means may be implemented in any way (for example, each acting on the crochet, on the body, on both of them and so on) for disabling any operation of the gripping devices (for example, being normally enabled and being disabled selectively, or vice-versa, as regards their opening, closing, translation or any combination thereof, and so on).

In an embodiment, the disabling means comprise, for each gripping device, means for keeping the hook separated from the abutment wall of the body when the gripping device is actuated to the closed condition. However, the disabling means may be implemented in any way (for example, with an eccentric, a piston and so on).

In an embodiment, the disabling means comprise, for each gripping device, an eccentric movable between a first position wherein it does not interfere with the crochet and a second position wherein it interferes with the crochet for spacing apart the hook thereof from the abutment wall of the body. However, the eccentric may be of any type (for example, circular, oval and so on) and it may space apart the hook from the abutment wall of the body to any distance.

Generally, similar considerations apply if the gripping device and the bookbinding sewing machine each has a different structure or comprises equivalent components (for example, of different materials) or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

An embodiment provides a method for sewing signatures into book blocks in a bookbinding sewing machine. In an embodiment, the method comprises forming (by one or more needles and one or more further crochets), one or more stitchings between the signatures of each of the book blocks by corresponding sewing threads. In an embodiment, the stitchings comprise one or more corresponding plain stitches formed by the needles and one or more corresponding looped stitches formed by the crochets concatenated to each other (the looped stitches ending with corresponding free loops on a last one of the signatures of each completed one of the book blocks). In an embodiment, the method comprises bringing (by corresponding one or more shuttles) the sewing threads each downstream the corresponding plain stitches along a formation direction thereof to an intermediate position aligned with the corresponding free loop along the advancement direction. In an embodiment, the method comprises bringing, by one or more corresponding gripping devices of above, a closing portion of each of the sewing threads from the intermediate position through the corresponding free loop along the advancement direction, the closing portion consisting of a portion of the sewing thread downstream the corresponding plain stitches along the formation direction thereof. In an embodiment, the method comprises actuating the gripping devices each to block the corresponding sewing thread at a gripping point comprised in the closing portion thereof. In an embodiment, the method comprises cutting the sewing threads being blocked (by one or more corresponding cutters) each downstream the gripping point thereof along the formation direction of the plain stitches. In an embodiment, the method comprises moving the gripping devices (each blocking the corresponding sewing thread being brought through the corresponding free loop) to pull the sewing thread being cut away from the free loop, thereby tightening the free loop around the sewing thread. In an embodiment, the method comprises bringing the gripping devices each to the open condition thereby releasing the corresponding sewing thread being pulled. However, similar considerations apply to the steps of the method as to the corresponding means of above used to implement them.

In an embodiment, the method comprises providing the corresponding gas jet to each of the gripping devices in the open condition. However, the gas jet may be provided at any time (for example, during the separation of each book block, periodically, in response to a corresponding command and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

The invention claimed is:

1. A gripping device for gripping a sewing thread in a bookbinding sewing machine, the gripping device comprising:

- a crochet having a hook for hooking the sewing thread, and
- a body having an abutment wall for the hook, the body and the crochet being slidable reciprocally along a longitudinal direction of the crochet between an open condition wherein the hook is distal from the abutment wall of the body for hooking the sewing thread and a closed condition wherein the hook is proximal to the abutment wall of the body for blocking the sewing thread, the body comprising one or more inlets for receiving a gas jet, one or more outlets at the abutment wall for directing the gas jet towards the book and one or more channels crossing the body between the inlets and the outlets for conveying the gas jet from the inlets to the outlets.

2. The gripping device according to claim 1, wherein the gripping device comprises biasing means for biasing the body and the crochet to the closed condition at rest.

3. The gripping device according to claim 2, wherein the crochet is provided with a stop element, and wherein the biasing means comprise elastic means acting between the body and the stop element to push the body and the crochet away from each other at rest, the body and the crochet being slidable reciprocally towards the open condition in opposition to the elastic means.

4. The gripping device according to claim 3, wherein the gripping device comprises a further body having a further stop element for blocking the body in abutment, the gripping device being brought to the open condition in response to a push of the crochet against the body being blocked by the further stop element.

5. The gripping device according to claim 4, wherein the further body and an assembly comprising the crochet, the body and the elastic means are slidable reciprocally between the closed condition and a safety condition wherein the further stop element does not interfere with the body for preventing a passage to the open condition.

6. The gripping device according to claim 5, wherein the further body comprises a sleeve having the further stop element at a first end thereof and a closure base at a second end thereof and wherein the body comprises a main portion and an interference element, an inner portion of the assembly comprising the interference element of the body, the elastic means and a corresponding portion of the crochet comprising the stop element being arranged between the further stop element and the closure base, with the main portion of the body projecting at least partly outside the sleeve through the further stop element.

7. The gripping device according to claim 6, wherein the closure base has a through hole for the sliding of the crochet, the crochet having a free portion opposite the hook projecting outside the sleeve through the through hole for moving the crochet among the safety condition, the closed condition and the open condition.

8. The gripping device according to claim 7, wherein the further stop element is arranged at a non-zero distance from the first end of the sleeve thereby defining a corresponding cavity for receiving the main portion of the body.

9. The gripping device according to claim 6, wherein a distance between the further stop element and the closure base is higher than a length of the internal portion of the assembly.

10. The gripping device according to claim 4, wherein the further body comprises a sleeve having the further stop element at a first end thereof and a closure base at a second end thereof and wherein the body comprises a main portion and an interference element, an inner portion of the assembly comprising the interference element of the body, the elastic means and a corresponding portion of the crochet comprising the stop element being arranged between the further stop element and the closure base, with the main portion of the body projecting at least partly outside the sleeve through the further stop element.

11. The gripping device according to claim 10, wherein the sleeve has a further inlet at the first end thereof for receiving the gas jet, the sleeve conveying the gas jet from the further inlet to the inlets of the body.

12. The gripping device according to claim 11, wherein the further stop element is arranged at a non-zero distance from the first end of the sleeve thereby defining a corresponding cavity for receiving the main portion of the body.

13. The gripping device according to claim 10, wherein the further stop element is arranged at a non-zero distance from the first end of the sleeve thereby defining a corresponding cavity for receiving the main portion of the body.

14. A bookbinding sewing machine for sewing signatures into book blocks, wherein the bookbinding sewing machine comprises:

one or more gripping devices each for gripping a sewing thread in the bookbinding sewing machine and each including a crochet having a hook for hooking the sewing thread, and a body having an abutment wall for the hook, the body and the crochet being slidable reciprocally along a longitudinal direction of the crochet between an open condition wherein the hook is distal from the abutment wall of the body for hooking the sewing thread and a closed condition wherein the hook is proximal to the abutment wall of the body for blocking the sewing thread, the body comprising one or more inlets for receiving a gas jet, one or more outlets at the abutment wall for directing the gas jet hook and one or more channels crossing the body between the inlets and the outlets for conveying the gas jet from the inlets to the outlets; and blasting means for providing the gas jet to each of the gripping devices.

15. The bookbinding sewing machine according to claim 14, wherein the bookbinding sewing machine comprises:

one or more needles and one or more further crochets for forming one or more stitchings between the signatures of each of the book blocks by corresponding sewing threads, the stitchings comprising one or more corresponding plain stitches formed by the needles and one or more corresponding looped stitches formed by the crochets concatenated to each other, each of the plain stitches comprising a single portion of the corresponding sewing thread extending between each pair of adjacent signatures, the looped stitches ending with corresponding free loops on a last one of the signatures of each completed one of the book blocks, one or more shuttles corresponding to the sewing threads each for bringing the corresponding sewing thread downstream the corresponding plain stitches along a formation direction thereof to an intermediate position aligned with the corresponding free loop along an advancement direction of the book blocks during the sewing thereof, the gripping devices corresponding to the sewing threads each for bringing a closing portion of the corresponding sewing thread from the intermediate position through the corresponding free loop along the advancement direction, the closing portion consisting of a portion of the sewing thread downstream the corresponding plain stitches along the formation direction thereof, an actuation mechanism for actuating the gripping devices each to block the corresponding sewing thread at a gripping point comprised in the closing portion thereof, one or more cutters corresponding to the sewing threads each for cutting the corresponding sewing thread being blocked downstream the gripping point thereof along the formation direction of the plain stitch, a moving mechanism for moving the gripping devices, each blocking the corresponding sewing thread being brought through the corresponding free loop, to pull the sewing thread being cut away from the free loop thereby tightening the free loop around the sewing thread, and the actuation mechanism for bringing the gripping devices each to the open condition thereby releasing the corresponding sewing thread being pulled.

16. The bookbinding sewing machine according to claim 15, wherein the bookbinding sewing machine comprises means for disabling each gripping device individually.

17. The bookbinding sewing machine according to claim 14, wherein the bookbinding sewing machine comprises means for disabling each gripping device individually.

18. The bookbinding sewing machine according to claim 17, wherein the disabling means comprise, for each gripping device, means for keeping the hook separated from the abutment wall of the body when the gripping device is actuated to the closed condition.

19. The bookbinding sewing machine according to claim 18, wherein the disabling means comprise, for each gripping device, an eccentric movable between a first position wherein it does not interfere with the crochet and a second position wherein it interferes with the crochet for spacing apart the hook thereof from the abutment wall of the body.

20. A method for sewing signatures into book blocks in a bookbinding sewing machine, wherein the method comprises:

forming, by one or more meddles and one or more further crochets, one or more stitchings between the signatures of each of the book blocks by corresponding sewing threads, the stitchings comprising one or more corresponding plain stitches formed by the needles and one or more corresponding looped stitches formed by the crochets concatenated to each other, each of the plain stitches comprising a single portion of the corresponding sewing thread extending between each pair of adjacent signatures, the looped stitches ending with corresponding free loops on a last one of the signatures of each completed one of the book blocks, bringing, by corresponding one or more shuttles, the sewing threads each downstream the corresponding plain stitches along a formation direction thereof to an intermediate position aligned with the corresponding free loop along an advancement direction of the book blocks during the sewing thereof, bringing, by one or more corresponding gripping devices, a closing portion of each of the sewing threads from the intermediate position through the corresponding free loop along the advancement direction, the closing portion consisting of a portion of the sewing thread downstream the corresponding plain stitches along the formation direction thereof, actuating the gripping devices each to block the corresponding sewing thread at a gripping point comprised in the closing portion thereof, cutting the sewing threads being blocked, by one or more corresponding cutters, each downstream the gripping point thereof along the formation direction of the plain stitches, moving the gripping devices, each blocking the corresponding sewing thread being brought through the corresponding free loop, to pull the sewing thread being cut away from the free loop thereby tightening the free loop around the sewing thread, bringing the gripping devices each to an open condition thereby releasing the corresponding sewing thread being pulled, and providing a gas jet to each of the gripping devices in the open condition, the gas jet being received by one or more inlets of the gripping device, being conveyed from the inlets to one or more outlets of the gripping device through one or more channels crossing a body of the gripping device between the inlets and the outlets, and being directed from the outlets towards a hook of the gripping device.

* * * * *